United States Patent [19]

Cooper

[11] 4,198,05(

[45] Apr. 15, 198(

[54] PROTECTIVE DEVICE FOR RECORD PLAYER

[76] Inventor: Tristan P. Cooper, 40aMonahan Ave., Purley, Surrey, England

[21] Appl. No.: 911,466

[22] Filed: Jun. 1, 1978

[51] Int. Cl.² ............................................... G11B 3/58
[52] U.S. Cl. ...................... 274/1 R; 274/47
[58] Field of Search ............... 274/1 R, 23 R, 25, 47, 274/24 R, 23, 24; 15/1.5 A, 1.5 R

[56] References Cited

U.S. PATENT DOCUMENTS

| | | | |
|---|---|---|---|
| 2,207,706 | 7/1940 | Andrews | 274/25 |
| 2,338,843 | 1/1944 | Glaser et al. | 15/1.5 R |
| 2,418,617 | 4/1947 | Bessire | 274/25 |
| 2,510,342 | 6/1950 | Kilgour | 274/37 |
| 2,955,825 | 10/1960 | Staar | 274/47 |
| 3,189,353 | 6/1965 | Grado | 274/47 |
| 3,301,565 | 1/1967 | Bachman | 274/23 R |
| 3,914,817 | 10/1975 | Lindsay | 15/1.5 R |

FOREIGN PATENT DOCUMENTS 2403603  8/1974  Fed. Rep. of Germany ......... 15/1.5 R

*Primary Examiner*—John W. Shepperd
*Attorney, Agent, or Firm*—Mason, Kolehmainen, Rathburn & Wyss

[57] ABSTRACT

A protective device for pivotable attachment to the cartridge or pickup arm of a record player so that, when lowered onto a moving record disc, the record will pivot the device from a guard position in which it hangs below the stylus to a playing position in which it is clear of the stylus. The device may comprise a contact brush which projects downward in the guard position, a cleaning brush which trails behind the stylus in the playing position, and a wiping brush which wipes the stylus when the pickup arm is raised from the record. The brushes may be conductive, and may be of carbon fibers, with arrangements for electrical connection to earth or ground through mounting means on the cartridge or pickup arm. Various means for acoustic damping are described. A method of making a brush assembly for the device is described, utilizing ultrasonic welding of pieces of plastics material to form a body.

16 Claims, 18 Drawing Figures

U.S. Patent
Apr. 15, 1980
4,198,056
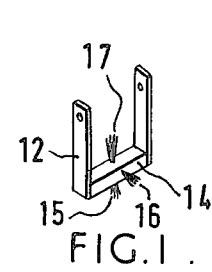
FIG.1.
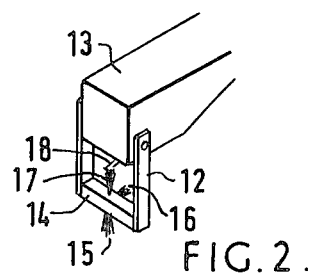
FIG.2.
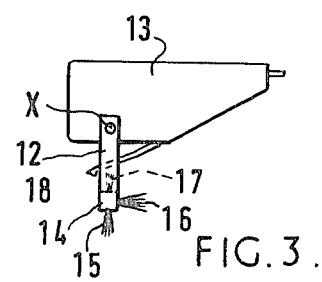
FIG.3.
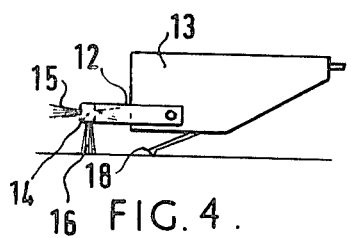
FIG.4.
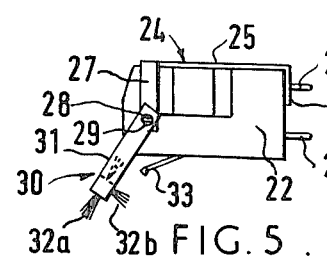
FIG.5.
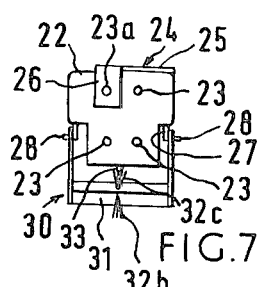
FIG.7.
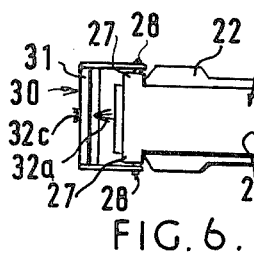
FIG.6.
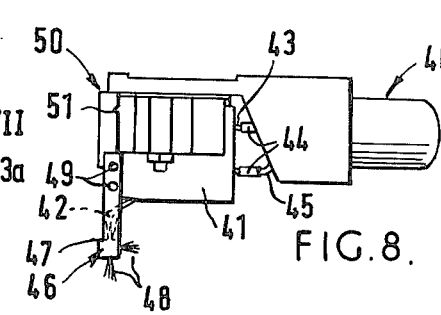
FIG.8.
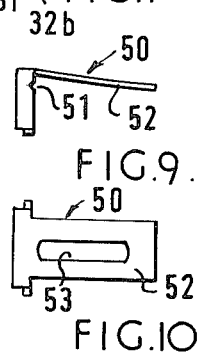
FIG.9.
FIG.10.
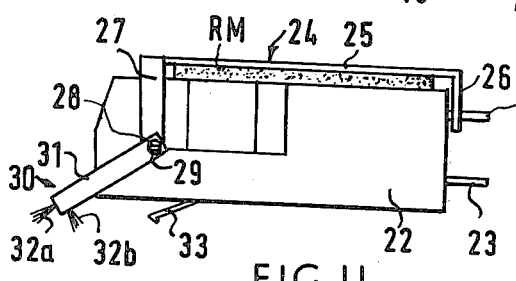
FIG.11.
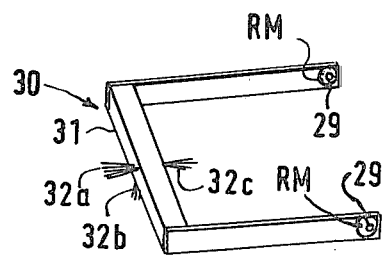
FIG.12.
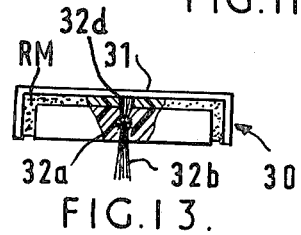
FIG.13.
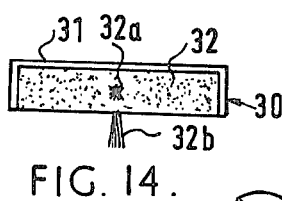
FIG.14.
FIG.18.
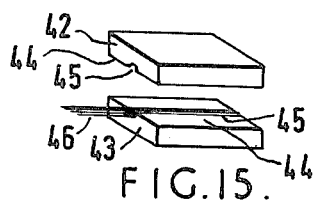
FIG.15.
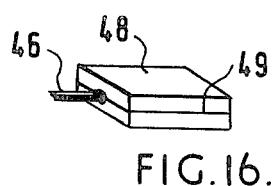
FIG.16.
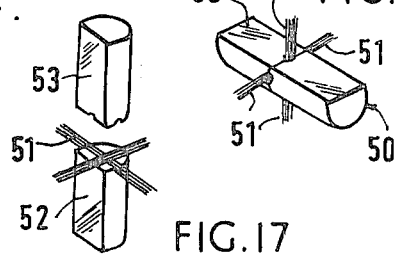
FIG.17

PROTECTIVE DEVICE FOR RECORD PLAYER

This invention relates to protective devices for phonograph, or gramophone, record players with a pickup arm having a phonograph cartridge with a stylus.

As is well known, the stylus can pick up an accumulation of dirt, dust or fluff from the record and seriously affect the performance of the cartridge. Moreover, a frequent cause of damage to the stylus, and/or a record, is the accidental dropping of the pickup arm on to the record player turntable or a record mounted on it. The record may also become charged with static electricity, which may discharge through the reproducing equipment with undesirable effects, and a record charged with static electricity will be even more liable to attract particles of dust. It is therefore desirable to provide protection for the stylus, cleaning of the record, removal of static electricity and cleaning of the stylus after use.

Individual means are known for preventing accumulation of static electricity on a record, for cleaning the record while it is being played, for cleaning the stylus after use and for protecting the stylus when not in use. For this last-mentioned purpose some makes of cartridges are provided with a plastic guard to protect the stylus from accidental damage, but this protection is not really satisfactory. Frequently through oversight an attempt to play a record is made with the guard still in position, whilst in other circumstances it is after the guard has been moved out of position that the pickup arm is knocked off its stand.

An object of the present invention is to provide an improved protective device which serves for stylus protection and preferably also for one or more of the other purposes mentioned above.

According to the present invention, in one aspect, there is provided a protective device for a record player with a pickup arm having a phonograph cartridge with a stylus which projects downwards when in use to contact the groove of a record beneath it, the device comprising a pivotable member having means for pivotable attachment of the said member to mounting means on the cartridge or the pickup arm in such manner that, when the pickup arm is lowered to place the stylus on the moving record, the record will engage the said member and pivot it from a guard position in which it hangs with a protective element thereof below the stylus to a playing position in which the said element is clear of the stylus.

The protective element preferably includes a cleaning element which contacts the record at a position trailing behind the stylus so as to clean the record groove.

The cleaning element preferably comprises a brush; also it is preferably of conductive material (which, in the case of a brush, may comprise conductive fibres) and earthed to conduct away static electricity from the record.

Preferably the pivotable member is a bracket freely suspended from the pickup arm to pivot about an axis which is horizontal in the normal working orientation of the cartridge. The bracket normally hangs freely with a lower member thereof below the stylus to act as a guard, this lower member comprising the said protective element and preferably carrying a cleaning brush as mentioned above.

The protective element, such as the lower member the bracket, preferably comprises a resilient cont element for engagement with the record, this elem preferably comprising a brush which in the guard po tion extends downwardly; if the pickup arm is drop it falls on this brush so that the stylus and any rec beneath it are protected from damage. Where both t cleaning element and the contact element compr brushes, this second brush contacts the record as t cartridge is lowered into the playing position, a movement of the record causes the pivotable member be moved forwards and upwards clear of the stylus a brings the cleaning brush into contact with the reco Preferably the protective element carries a bru which is arranged to wipe the stylus as the memt pivots between the guard position and the playing po tion.

Thus, the protective element preferably comprise body with guard, cleaning and wiping brushes proje ing from it in three directions. Moreover, a fourth bru may be provided for earthing purposes, this brush bei cut off short so as to contact a conductive bar or st constituting the lower member of the bracket.

According to the invention, in another aspect, there provided a method of making a brush or an assembly brushes for a protective device according to the fi aspect. In this method brush fibres are placed betwe pieces of plastics material and the pieces are weld together by ultrasonic staking to form the body of t brush and trap the fibres in position.

Further features of the invention will be appare from the following description.

The invention will now be described, by way of ample, with reference to the accompanying drawings which:

FIG. 1 is a diagrammatic perspective view of a p tective device embodying the invention;

FIG. 2 is a diagrammatic perspective view of t device attached to a cartridge and in its guard positi FIGS. 3 and 4 are diagrammatic side views of t device attached to the cartridge and respectively in t guard position and the record-cleaning position;

FIG. 5 is a diagrammatic side view of a phonogra cartridge carrying a protective device;

FIG. 6 is a plan view of the device of FIG. 5;

FIG. 7 is a view in the direction of the arrow VII FIG. 6;

FIG. 8 is a side view of another phonograph c tridge carrying a protective device and mounted on t head of a pickup arm;

FIGS. 9 and 10 are side and plan views of a mounti bracket shown in FIG. 8;

FIGS. 11 to 14 illustrate various ways in which re ient damping material may be provided with such p tective devices;

FIGS. 15 and 16 illustrate a method of maki brushes; and

FIGS. 17 and 18 illustrate the method applied to t making of an assembly of brushes of the form employ in protective devices illustrated in the earlier Figure Referring first to FIGS. 1 to 4, these show a prot tive device for a record player. This comprises a rect gular U shaped bracket 12 the upper end of the s arms of which are pivotally attached to a phonogra cartridge 13 (on a pickup arm, not shown) so that bracket can pivot about the axis X which in the norr position of the cartridge is horizontal. The lower me ber 14 of the device carries three brushes, a cont ish 15, a cleaning brush 16 and a stylus wiping brush for wiping the stylus 18 of the cartridge. In the guard ition of the device the bracket hangs freely downrdly with the contact brush 15 also pointing downrdly and extending below the stylus 18. It thus acts as uard to protect the stylus and a record below from nage if the pickup arm is dropped.

When the cartridge is lowered by the pickup arm on a moving record to start playing, the contact brush 15 itacts the record and the whole bracket is swept ward and upward, by the relative movement of the ord and cartridge, to the position shown in FIG. 4 in ich, while the stylus contacts the record groove and ys as usual, the brush 16 trails behind the stylus and ntinuously cleans the groove. When the pickup arm is in raised the bracket 12 will swing back to its guard ition. As the bracket swings between the guard posi- and the cleaning position the wiping brush 17 wipes stylus 18.

The brushes are all made of conductive fibre (specifily, about 10,000 carbon fibres in each brush) and are thed through the cartridge so that static electricity is iducted away from the record to earth without passthrough the reproductive system. The diameter of h fibre is small enough to penetrate into the record ove. Arrangements can be made that, as the carlge is returned from its playing position to its rest ition, the cleaning brush is itself automatically aned by, for example, a rod or a flat plate (possibly h textile material on it) fixed to the record deck in h a position that the bristles of the cleaning brush are tly stroked while the pickup arm is being placed on stand, thus dispersing any dust or fluff which has ered to the brush.

An alternative mounting and earthing arrangement is wn in FIGS. 5–7, in which a conventional phonoph cartridge is shown diagrammatically at 22, havfour pins (three referenced 23 and one, an earthing , referenced 23a) by which it can be plugged into a ket at the end of the playing or pickup arm of a nograph. A mounting bracket 24 is stamped and it from a piece of conductive sheet metal, which may a copper alloy giving the bracket a degree of resilce. The bracket comprises a plane portion 25 extendover the top of the cartridge and at the rear end ing a tab 26 bent down to embrace the earthing pin adjacent the rear face of the cartridge so that it ms electrical contact with the earthing pin 23a. At front end the bracket has arms 27 extending downrdly and embracing the sides of the cartridge. The ls of the arms are turned outwardly and formed to vide pivot pins 28 which enter holes 29 near the ends he arms of a protective device 30, generally similar hat of FIGS. 1–4, so that it can pivot about a horital axis. In this example, the protective device coms a U shaped member 31 of conductive material ich may be aluminium or an alloy thereof. The base the U shaped member carries and is in conductive nection with three brushes 32a, 32b, and 32c of contive fibres. The device 30 is pivotable between a rd position shown in FIG. 7 in which it extends ow the stylus 33 and a working position shown in 3. 6 in which the brush 32b contacts a record to clean The bracket 24 thus serves both as a mounting and as earth connecting means for the cleaning device. The ductive connection with the brushes, mentioned ve, could be effected by mounting the brushes in a conductive body carried by the U shaped member 31, but the body need not be conductive if the brushes include a fourth conductive brush 32d protruding from the body in the opposite direction to that of the cleaning brush 32b and making contact with the base of the U shaped member 31, the fourth brush being electrically connected to the other three brushes, preferably by being an integral extension of the cleaning brush 32b which is mounted in contact with an integral pair constituting the contact brush 32a and wiping brush 32c. This arrangement may be more clearly understood from the description hereinafter of a method of making such an assembly of brushes.

Another alternative mounting and earthing arrangement is shown in FIG. 8, which shows the head of a pickup arm 40 having a cartridge 41 with a stylus 42 and four pins 43 receiving terminal clips 44 for the electrical connections 45 to the record player. The protective device 46 comprises a U shaped member 47 carrying brushes 48, generally similar to the device of FIGS. 5 to 7 but in this case having, for example, two alternative mounting holes 49. The mounting bracket 50 in this case has the form shown in side view in FIG. 9 and plan view in FIG. 10: no earthing tab (such as 26) is provided, the earthing connection being completed by means of the mounting bracket at a notch 51 therein and is taken to the earthed terminal clip (44) of the pickup. The upper portion 52 of the mounting bracket 50 is pierced at 53 and is slightly bowed to enhance the security of clamping of this portion between the cartridge 41 and the adjacent end portion of the pickup arm 40.

It may be desirable to provide resilient damping material in the arrangements hereinbefore described, in order to prevent the transmission of vibrations from the record disc to the phonograph cartridge through the means of the record cleaning device and mounting bracket. One such damping arrangement is shown in FIG. 11 which shows a cartridge 22, protective device 30 and mounting bracket 24 similar to those of FIGS. 5 to 7. A flat sheet of resilient damping material RM (for example, high carbon rubber) is placed between the cartridge 22 and the upper portion 25 of the bracket 24.

Instead, or in addition, a small circular bush of resilient damping material RM may be fitted into each of the mounting holes 29 in the arms of the U shaped member of the protective device 30, as shown in FIG. 12.

As another alternative or addition, a strip of resilient damping material RM may be installed between the U shaped member 31 and the brush block 32, as shown diagrammatically in FIG. 13. A conductive path from the brushes 32a, 32b and 32c to the base of the U shaped member 31 (shown here in underneath view) may be provided through the resilient damping material RM if it is conductive. Alternatively the fourth brush (previously mentioned) could be made to extend through an aperture in the resilient damping material so as to make direct contact with the U shaped member 31.

A further possibility, shown in FIG. 14, is to make the brush block 32 itself of resilient material.

The provision of resilient damping material in any of the above positions prevents, or very substantially reduces, the transmission of vibrations from the record disc via the cleaning brush 32b, the brush block 32, the U shaped holder 31 and the mounting bracket 24 to the phonograph cartridge, while still permitting the conduction of static electricity away from the record disc to the earth connection of the cartridge.

FIG. 15, illustrating the principles of the method of the present invention, shows two bodies 42, 43 of plastics material, e.g. Polystyrene G P, formed in their facing surfaces 44 with grooves 45. A bundle of fibres 46 is located in the groove 45 of the lower block so that they project beyond the block; the upper block is then placed on top of the lower block to trap the fibres in position. The blocks are held together and ultrasonic vibrations are applied which generate sufficient heat at the interface to weld the faces 44 together. The finished article of FIG. 16 is seen as comprising a brush 46 mounted in a mounting block 48 of plastics material, the welded joint being indicated at 49.

FIG. 18 shows an assembly of brushes made by a similar technique but in this case comprising a block 50 of D shaped cross-section having conductive fibres protruding from it in four directions in the form of a cross and thus providing four conductive brushes 51, 51a. As seen in FIG. 17 the fibres are placed in grooves on one surface of a plastics material piece 52, another plastics material piece 53 is placed on top of the fibres to clamp them between the pieces, and the pieces are welded together by ultrasonic technique as before. The brush 51a, which protrudes from the flat face 55 of the block, is subsequently cut off short to contact the conductive U shaped member (30 or 46) of the protective device when the block is mounted thereon, for example, by means of an adhesive, with the flat face 55 against the surface of the strip constituting the base of the U shaped member.

What is claimed is:

1. A protective device for a record player with a pickup arm having a phonograph cartridge with a stylus which projects downwards when in use to contact the groove of a record beneath it, said device comprising a pivotable member having a protective member and means for pivotably attaching said pivotable member to the cartridge or the pickup arm in such a manner that, when the pickup arm is lowered to place the stylus on the moving record, said pivotable member engages said record to pivot the same from a guard position wherein said protective member hangs below the stylus to a playing position wherein said protective member is clear of the stylus, a contact brush affixed to said pivotable member for engaging said record upon lowering of said pickup arm and pivoting said pivotable member toward said playing position as a result of movement of said record, and a wiping element which projects upwards towards the stylus when the pivotable member is in the guard position and cooperates with the stylus to remove dust and fluff therefrom when the pivotable member pivots between said contact position and said guard position.

2. A protective device according to claim 1, wherein said pivotable member further includes a cleaning element affixed to said pivotable member which contacts the groove of the record at a position trailing behind the stylus when said pivotable member is in said playing position.

3. A protective device according to claim 2, wherein the cleaning element comprises a cleaning brush.

4. A protective device according to claim 3, wherein said pivotable member is electrically conductive and said cleaning brush comprises conductive fibres, said fibres being electrically coupled to said pivotable member to provide an electrical connection between said record and said cartridge or pickup arm when said pivotable member is in said playing position.

5. A protective device according to claim 4, wherein the pivotable member is U shaped, having a base and two arms extending from said base, wherein said pivotably attaching means are disposed on said arms.

6. A protective device according to claim 5 further including a block from which at least the cleaning brush of conductive fibres protrudes affixed to said pivotable member, said block including a conductive brush protruding from the block in a direction opposite that of the cleaning brush, said conductive brush being electrically connected to said cleaning brush and contacting said pivotable element to provide an electrical connection between said pivotable element and said cleaning brush.

7. A protective device as recited in claim 4 wherein said conductive fibres are fabricated from carbon.

8. A protective device according to claim 1, wherein said pivotable member is electrically conductive and said contact brush comprises conductive fibres, said fibres being electrically coupled to said pivotable member to provide an electrical connection between said record and said cartridge or pickup arm when said pivotable member is in said guard position.

9. A protective device as recited in claim 8 wherein said conductive fibres are fabricated from carbon.

10. A protective device according to claim 1, wherein the wiping element comprises a wiping brush.

11. A protective device according to claim 10 wherein the wiping brush comprises conductive fibres.

12. A protective device as recited in claim 11 wherein said conductive fibres are fabricated from carbon.

13. A protective device according to claim 1, wherein said pivotably attaching means includes a conductive mounting bracket having a tab for supporting said pivotable member between the cartridge and the head of the pickup arm.

14. A protective device according to claim 13 wherein the said tab is formed to make electrical contact with an earthing pin at the rear of the cartridge 15. A protective device according to claim 1, having resilient damping means for inhibiting the transmission of vibrations from the device to the cartridge during the playing of a record.

16. A protective device for a record player with pickup arm having a phonograph cartridge with a stylus which projects downward when in use to contact the groove of the record beneath it, the device comprising an electrically conductive pivotable member having protective member and means for pivotably attaching said pivotable member to the cartridge or the pickup arm in such manner that, when the pickup arm is lowered to place the stylus on the moving record, the pivotable member will engage the moving record and be pivoted from a guard position in which said protective element lies below the stylus to a playing position in which said element is clear of the stylus, said pivotable member including a plurality of carbon fibre brushes comprising a first conductive brush extending from said protective element and electrically coupled thereto for engaging said record upon lowering of said pickup arm and pivoting said pivotable member to said playing position as a result of movement of the record, a second conductive brush extending from said protective element and electrically coupled thereto and contacting said record in said playing position to provide an electrical connection between said record and the cartridge or pickup arm while simultaneously cleaning the grooves of said record, and a third brush which projects toward said stylus when said pivotable member is in the guard position and is operative to remove dust and fluff from the stylus when the pivotable member pivots between the guard and playing position.

* * * * *